United States Patent [19]
Allen

[11] 3,939,064
[45] Feb. 17, 1976

[54] FEED CLEANER
[75] Inventor: Dee Dexter Allen, Zeeland, Mich.
[73] Assignee: U. S. Industries, Inc., New York, N.Y.
[22] Filed: Dec. 4, 1974
[21] Appl. No.: 529,467

[52] U.S. Cl. ................. 209/44; 209/483; 209/490
[51] Int. Cl.² ........................................ B07B 13/00
[58] Field of Search .......... 209/173, 235, 361, 360, 209/247, 261, 479, 483, 490, 492, 44, 252; 119/52 AF, 51 CF; 198/229, 230, 188

[56] References Cited
UNITED STATES PATENTS

| | | | |
|---|---|---|---|
| 1,073,758 | 9/1913 | Hopkins | 209/492 |
| 1,439,699 | 12/1922 | Fisk | 209/361 |
| 1,466,894 | 9/1923 | Dunton | 209/361 |
| 2,591,609 | 4/1952 | Roberts et al. | 209/261 X |
| 3,057,329 | 10/1962 | Cordis | 119/52 AF X |
| 3,773,175 | 11/1973 | Wallace | 209/173 |
| 3,831,751 | 8/1974 | Pirovano | 209/247 |

Primary Examiner—Frank W. Lutter
Assistant Examiner—Ralph J. Hill
Attorney, Agent, or Firm—Price, Heneveld, Huizenga & Cooper

[57] ABSTRACT

A plurality of axially spaced blades are rotated by a drive shaft positioned above the feed trough. The blades rotate transversely through the upper feed layer skimming off the foreign matter which is deposited in a container alongside the trough as the blades are rotated downwardly. Preferably, the blades are rotated through scraping wires on their downward track to clean the blades prior to passing through the feed once more.

17 Claims, 4 Drawing Figures

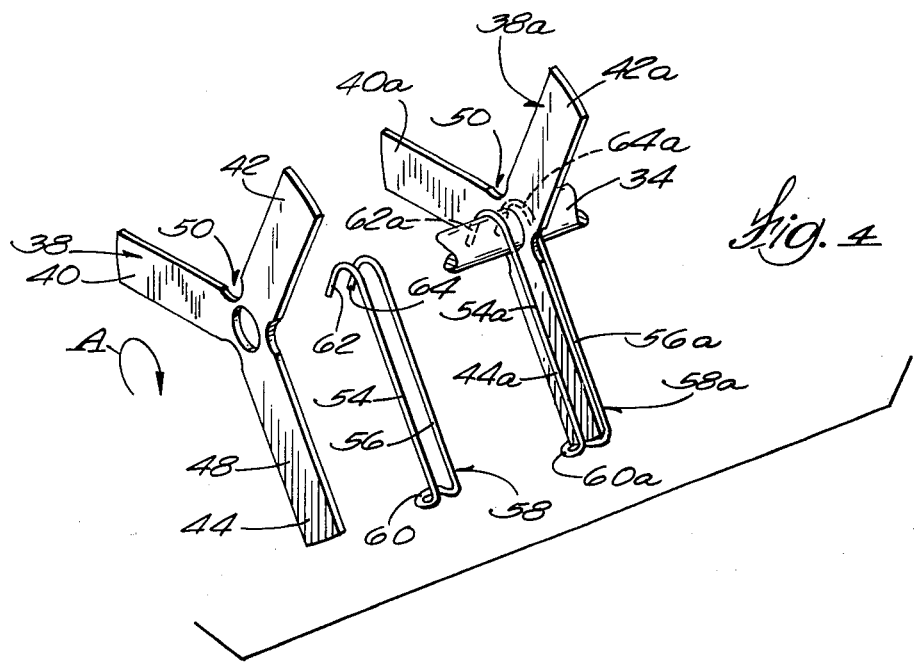
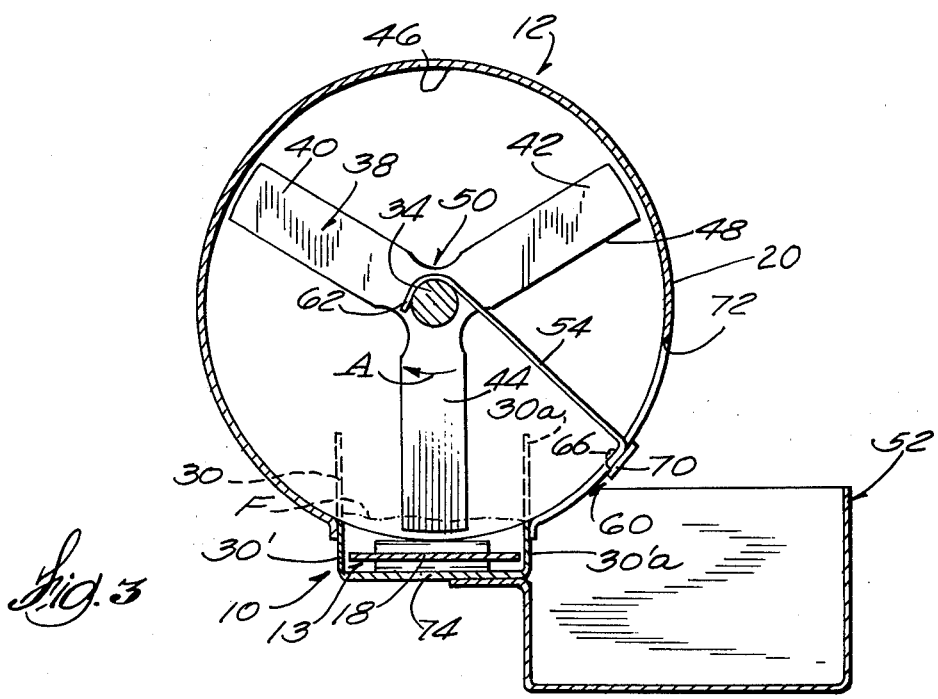

3,939,064

FEED CLEANER

BACKGROUND OF THE INVENTION

This invention relates to an apparatus for separating foreign material from feed, and more particularly such apparatus being adapted to be used in combination with power driven feeding equipment utilizing a trough tracing a closed path with a feed conveyor or distributor means moving through the trough.

In feed systems of the type described above, which can be more generally termed automatic feeding systems, a problem continuously arises in that the feed collects foreign matter as a result of bedding, droppings and other undesirable foreign matter falling into the trough with the feed. The whole mixture of feed and such foreign matter then travels along the trough and builds up a collection to the point that the feed may become saturated with non-edible material requiring cleaning to allow the feeding system to operate effectively. Manual cleaning, of course, is time consuming, difficult to carry out effectively and hence costly.

Many attempts have been made in the past to automatically accomplish this separation. Various combinations of pushing the mixture from the trough into a screen rotated by a complicated series of gears and shafts having buckets or cups to transfer the feed from a well to a chute back into the trough have been constructed. These devices are costly to construct, difficult to assemble and rough in operation. Their structure is such that a great deal of power is needed to operate them because of the necessity of moving the feed over a relatively large distance. This causes wear and tear on all parts involved and lowers the efficiency of the device. Also, the disadvantages listed above become critical in high speed applications resulting in thrown feed which is both wasteful and messy.

A greatly improved device over these prior art attempts was developed utilizing a cylindrical screen rotatable on an axis transverse to the trough which caused the feed to be picked up into the screen and sifted directly back into the trough keeping foreign matter within the confines of the screen. Such a device is described and illustrated in U.S. Pat. No. 2,985,302 issued May 23, 1961 to Jan Brands and commonly assigned to the assignee of the subject application. While the type of separator described in the above identified patent is quite effective, it is further desired to improve on such systems in both an economical and functional manner. For example, it is desired to provide an automatic separation of foreign matter from the feed without diverting the feed in any substantial manner from its movement through the trough. Thus, there is a need in this art for an improved apparatus for separating foreign matter from feed.

SUMMARY OF THE INVENTION

In accordance with the invention, a drive shaft is rotatably mounted in a direction generally parallel to the longitudinal axis of the feed trough and rotates a plurality of axially spaced generally aligned blades extending radially from the shaft so that their ends pass transversely through the feed to skim off foreign matter and deposit same in a container adjacent the trough.

In narrower aspects of the invention, the shaft and blades are mounted in a cylindrical housing which prevents the foreign matter from falling back into the trough while it is being carried for deposit into the container. Scraper wires are also mounted radially to the shaft intermediate the blades over the container to clean the blades as they rotate through each cycle. The drive shaft is driven by a takeoff from the feed conveyor mechanism itself which is moving through the feed trough.

A particular advantage of the subject invention is that the feed being conveyed through the trough is cleaned without diverting the path of the feed in any fashion. The blades simply skim through the feed separating the foreign matter and depositing same through their rotation into a container adjacent the trough. Most of the foreign material is in the upper layers of the feed and the natural motion of the feed as it is conveyed by the conveyor means causes most of the foreign matter to shift to the top so that the blades do not have to be brought into interference with the conveyor chain itself but merely skim the upper portion of the feed layers. This has been found to be sufficient to maintain a proper degree of cleanness. The subject invention permits a greatly simplified overall mechanism and the utilization of a cylindrical housing keeps the entire area clean. The container in which the foreign is deposited is conveniently positioned adjacent the trough beneath a portion of the cylindrical housing and may be detachably connected for emptying. The cleaner mechanism is preferably located near a directional change in the trough which requires a conveyor chain idler sprocket or the like which permits a simple gear arrangement takeoff for driving the drive shaft of the cleaner. In this fashion, the cleaner only operates when the conveyor does. Of equal importance, direct drive of the cleaner permits high speed operation since the speed of the cleaner will increase as the feed conveyor does. Direct cleaning without diverting the feed also reduces or eliminates the feed from being thrown out. The simplicity of the arrangement not only makes for a more economical package at the fabrication stage, but also provides good service life with little or no upkeep.

DESCRIPTION OF THE DRAWINGS

FIG. 3 is a cross-sectional view taken along line III—III of FIG. 1; and

FIG. 4 is a fragmentary exploded view of two of the cleaning blades in perspective.

DESCRIPTION OF THE PREFERRED EMBODIMENT

Figure 2:
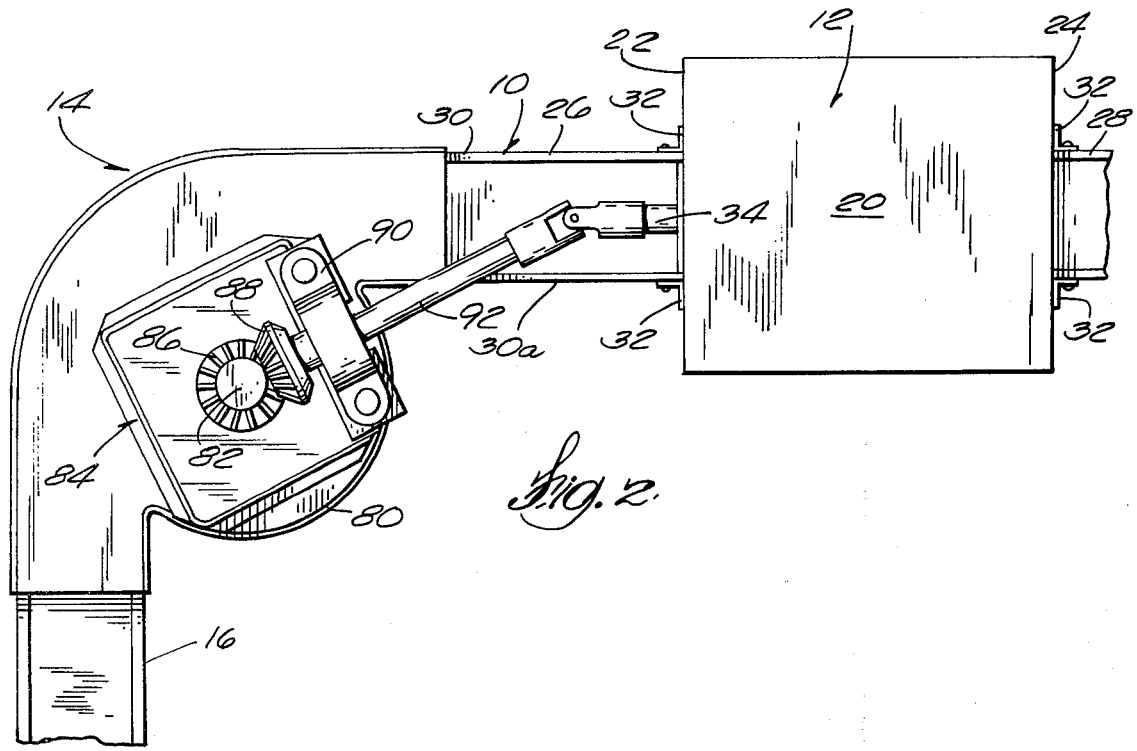
FIG. 2 is a fragmentary plan view of the device illustrated in FIG. 1.

Referring now to the drawings in detail, reference numeral 10 designates a trough section and a housing 12 located intermediately the ends of section 10. The trough section is adapted to be connected in a continuous, endless trough feeder represented in part by the elbow section 14 and continuing through subsection 16. An endless driven chain 18 is driven continuously about the closed track of the troughs by a suitable power drive means well-known in the art. This distributes the feed F throughout the open trough portions for feeding by the poultry.

Housing 12 has a cylindrical configuration as illustrated in FIG. 3 comprising a cylindrical shell 20 and a pair of end plates 22 and 24. Trough section 10 includes a portion 26 and 28 to each side of housing 12.

An inlet opening is provided in end plate 24 for trough section 28 and an outlet opening is provided in end plate 22 for trough section 26 to permit flow of feed through housing 12. Sections 26 and 28 include sides 30 and 30a of normal height and the bottom of housing 12 has a longitudinal opening 13 and the sides 30, 30a within the housing are shortened appropriately as illustrated by reference numerals 30', 30'a. This permits clearance for the cleaning blades 38, 38a, 38b, etc., the significance of which will be described hereinafter.

As shown in FIG. 2, the housing is secured to trough portions 26, 28 by fasteners illustrated by reference numeral 32 and the housing can be removed by making the fasteners removable or alternatively, by making trough portion 10 one unit which can be conventionally positioned as a section. A drive shaft 34 is rotatably mounted through end plates 22 and 24 and extends outwardly beyond end plate 22 with a universal type fitting 36. A plurality of axially spaced radially extending feed cleaning blades 38, 38a, 38b, 38c, 38d, etc., are anchored to shaft 34 and rotatable therewith. In the preferred embodiment illustrated, each blade 38, 38a, etc., is comprised of three fins 40, 42, 44, etc. Thus, for each revolution of blades 38, three fins traverse the circle of rotation.

Figure 1:
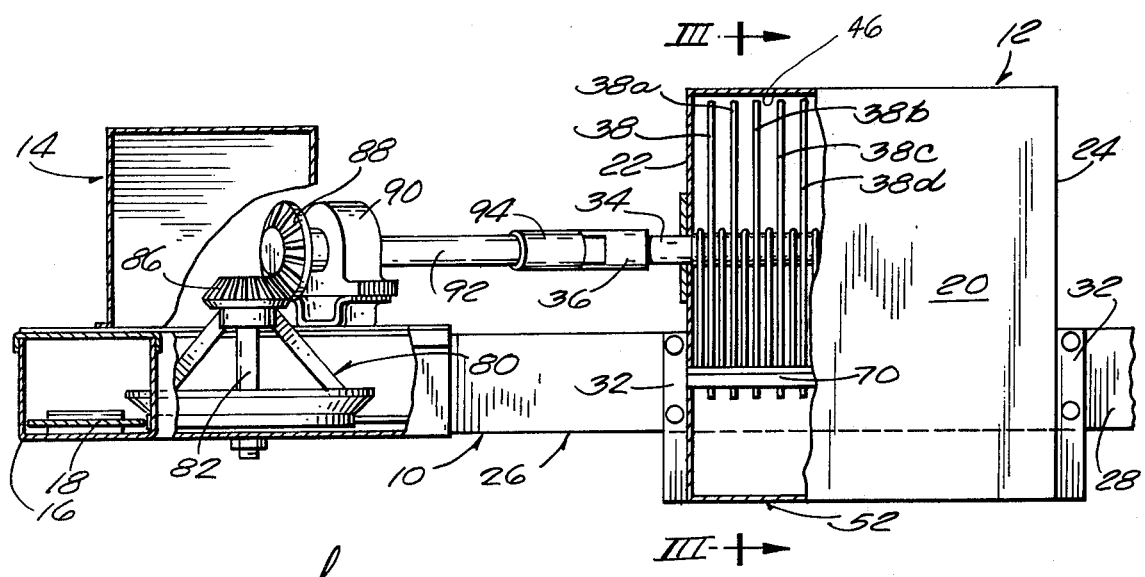
FIG. 1 is a fragmentary side elevation view in cross section of the feed cleaner of the invention.

Referring to FIGS. 1 and 3, the length of each fin is such that it terminates in close proximity to the interior surface 46 of cylindrical shell 20. As illustrated in FIG. 3, as blades 40 are rotated in the direction of arrow A each fin passes through a substantial upper portion of feed F being conveyed through the trough although the blades clear the conveyor chain 18 as illustrated. Each of the blades 38, 38a, 38b, etc., are preferably aligned so that as a particular series of aligned fins such as fins 44 traverse through the upper layer of feed F, they cooperate together as a unit picking up any foreign matter in the feed and carrying it on their forward leading edges 48. As the blade and respective fins rotate, the foreign matter might move slightly along leading edges 48, but will not fall back into the trough since the interior surface 46 of shell 20 acts as a stop or shield. The rate of rotation in the preferred embodiment is preferably set so that the centrifugal force exerted through the rotation of the foreign matter will not permit it to fall back into the web portions 50 of any two neighboring fins. In addition, it will be appreciated that the foreign matter will be positioned as it is rotated up out of the feed at the outer radial extremity of each fin. As the fin passes from the vertical position toward the downward position so that the leading edge 48 of the particular fin faces downwardly, the foreign matter will by its gravitational weight separate from the fin and fall into a collecting container 52 illustrated in FIG. 3.

In the preferred embodiment, blade cleaning wires 54 and 56 are utilized to remove any foreign matter that is picked up by the cleaning blades which might otherwise adhere thereto due to its moistness or stickiness. Each pair of cleaning wires, 54, 56 or 54a, 56a, etc., is comprised of a single shaped wire 58 having a loop 60 formed at its middle portion causing the two aligned wires 54 and 56 to be slightly spaced from each other terminating at each free end in a hook portion 62, 64 respectively. The hook ends 62, 64 are configurated to fit tightly over drive shaft 34 and the loop ends 60, 60a are secured by mechanical fastener 66 to a support bar 70 secured to each end plate 22, 24 of housing 12. Support bar 70 extends intermediate the end plate in an opening 72 which permits foreign matter falling off blades 38, 38a, etc., to drop through opening 72 into container 52. Each of the cleaning wires 54, 56; 54a, 56a, (FIG. 4) are spaced respectively from each other a distance closely related to the width of each fin of the blade so that as the fin passes through the opening between each cleaning wire, a scraping effect is provided along each side of the fin which causes foreign matter of any size which might otherwise adhere to each fin to be separated from the fin and drop into container 52. Container 52 incidentally can be secured permanently to the bottom wall 74 of trough portion 10 or secured in a removable fashion so that it can be removed entirely for emptying. The shell 20 can also be removable to permit easy access for cleaning etc.

Referring now to FIGS. 1 and 2, an idler sprocket 80 is illustrated rotatably secured about a vertical shaft 82 in elbow section 14 to assist the feed chain 18 in traversing a change of direction of 90°. A sprocket housing 84 is illustrated which encloses the sprocket assembly. A bevel gear 86 is mounted on shaft 82 in mesh engagement with a bevel gear 86. The latter is mounted on the end of a shaft 92 secured in mounting bracket 90. The conventional power means which drives the drive chain 18 can thus be utilized to provide a drive for the cleaning assembly through shaft 34. By providing an appropriate mating adapter 94, the actuation of the cleaning blades is directly linked to the operation of the trough. Thus when the trough is operative, the cleaner is operative and likewise if the trough is stationary, the cleaner is stationary. Also, the speed of the cleaner increases in direct proportion to the speed at which the conveyor is being operated.

OPERATION

Having described the preferred arrangement, its operation should be obvious. With the feed trough in an operative condition, chain 18 propels or conveys feed along the trough in a circuitous path for feeding poultry or the like. As the feed passes through housing 12, the blades 38, 38a, etc., are rotating such that for each rotation, three aligned fins traverse through the upper layer of the feed to skim off any foreign material. This foreign material is carried on the outer leading edges of the fins in a circular fashion until it either falls into container 52 by its gravitational weight off the leading edge when the leading edge is in the downward facing position or is separated from the fin by the scraping or cleaning effect of the cleaning wires 58, 58a, etc.

The blades are propelled by the rotation of drive shaft 34 which is driven by the bevel gear arrangement and shaft 92. By selecting the ratio of the bevel gears 86, 88, the rotation of shaft 34 can be selected such that for at least one or more sweeps of aligned fins, an entire section of feed is skimmed for foreign matter and by the time the next series of aligned fins pass through the feed again, there will be no portion of feed being conveyed which will traverse the cleaning housing 12 without being acted upon by the cleaning fins.

Although but one embodiment has been shown and described in detail, it will be obvious to those having ordinary skill in this art that the details of construction of this particular embodiment may be modified in a great many ways without departing from the unique concepts presented. It is therefore intended that the invention is limited only by the scope of the appended claims rather than by particular details of construction shown, except as specifically stated in the claims.

The embodiments of the invention in which an exclusive property or privilege is claimed are defined as follows:

1. A poultry feed cleaner for cleaning feed being conveyed along a feed trough comprising in combination: a drive shaft rotatably mounted in a direction generally parallel to the direction of the feed trough, a plurality of axially spaced generally aligned blades secured to said shaft and extending radially therefrom, said blades being rotated with said shaft for transverse movement through the feed being conveyed through said trough, said blades being spaced from each other sufficiently to remove foreign matter in the feed without removing any sufficient amounts of feed.

2. The poultry feed cleaner according to claim 1 wherein said cleaner includes a receptacle means adjacent the trough portion through which said blades are operative, said blades picking up foreign material on or between one or more leading edges of adjacent blades and transferring same on the leading edges of said blades as said blades are rotated upwardly until said leading edges are rotated downwardly wherein the foreign matter drops by its weight into said receptacle.

3. The poultry feed cleaner according to claim 2 wherein said feed cleaner further includes cleaning wires extending radially from said drive shaft beyond the terminal end of said blades above said receptacle, said wires being positioned in close proximity to the path of said blades such that when said blades pass by said wires, foreign material adhering to said blades will be separated therefrom and deposited in said receptacle.

4. The poultry feed cleaner according to claim 3 wherein a pair of said cleaning wires are provided for each blade, each pair of wires being spaced axially a distance slightly greater than the width of each blade.

5. The poultry feed cleaner according to claim 4 wherein alternate pairs of wires for alternate blades is formed of a single wire folded back, the ends of each single wire being anchored to the drive shaft on each side of the respective alternate blades each intermediate alternate blade being cleaned by one wire of each adjacent alternate pair of wires.

6. The poultry feed cleaner according to claim 5 wherein said folded back wire forms a loop at their midsection which is anchored to a support spaced from said drive shaft a distance greater than the radial length of each blade.

7. The poultry feed cleaner according to claim 6 wherein each of said blades are comprised of a plurality of circumferentially spaced fins in general alignment with each other.

8. The poultry feed cleaner according to claim 2 wherein said cleaner includes a generally cylindrical housing enclosing said blades, said housing having a cylindrical interior surface positioned in close proximity to the terminal end of said blades so that foreign material removed from the feed as it passes through said cleaner is prevented from being moved beyond the end of said blades and returning to said feed trough.

9. The poultry feed cleaner according to claim 8 wherein said cylindrical housing includes an opening the length thereof above said receptacle to permit free deposit of foreign material carried on said blades to drop into said receptacle.

10. The poultry feed cleaner according to claim 1 wherein said drive shaft is driven by a takeoff means cooperative with the conveyor in the feed trough whereby said blades are rotated during operation of the conveyor means in direct proportion to the speed of the conveyor and are stationary when the conveyor means are stationary.

11. The poultry feed cleaner according to claim 10 wherein said blades are comprised of a plurality of circumferentially spaced fins in general alignment with each other.

12. A poultry feed cleaning apparatus for positioning in cooperative association with a feed conveyor means comprising, in combination: a housing having side and end walls and means defining a bottom opening extending generally between said end walls, an inlet opening in one end wall and an outlet opening in the other of said end walls for communication with a feed conveyor means such that poultry feed is conveyed through said housing below said bottom opening; a rotatable shaft mounted in said housing between said end walls above said bottom opening said shaft extending in a direction parallel to said conveyor means; a plurality of axially spaced blades secured to said shaft and extending radially therefrom, said blades being rotatable with said shaft for transverse movement through feed being conveyed through said housing, said blades being sufficiently spaced to pick up foreign material and the like and deposit same in a receptacle positioned adjacent the portion of feed conveyor means being cleaned by said blades, said receptacle being partially positioned beneath said bottom opening of said housing.

13. The poultry feed cleaning apparatus according to claim 12 wherein said housing side is a cylindrical shell having an interior surface positioned in close proximity to the terminal end of said blades said spacing therebetween preventing any substantial amount of foreign material to be removed prematurely from said blades.

14. The poultry feed cleaning apparatus according to claim 13 wherein said blades are comprised of a plurality of fins spaced circumferentially and in general alignment with each other.

15. The poultry feed cleaning apparatus according to claim 14 wherein said apparatus further includes cleaning wires extending radially from said drive shaft intermediate each of said blades above said receptacle, said wires being positioned in close proximity to the path of said blades such that when the fins of said blades pass by said wires, foreign material adhered to said blades will be separated therefrom and deposited in said receptacle.

16. The poultry feed cleaning apparatus according to claim 15 wherein a pair of wires are provided for each blade, each pair of wires being spaced axially a distance from each other slightly greater than the width of said blades to provide a scraping means for scraping foreign material adhered to said blades.

17. The poultry feed cleaning apparatus according to claim 16 wherein said drive shaft extends beyond one of said end walls of said housing and is rotated by a takeoff means cooperative with said feed conveyor means whereby said cleaning apparatus is operative when said feed conveyor means is operative at a speed proportional to the speed of the conveyor and stationary when said feed conveyor means is stationary.

* * * * *